March 29, 1932. A. A. HEYMAN 1,851,578

METHOD OF BAKING ICE CREAM CONES

Filed Feb. 7, 1930

INVENTOR.
ALBERT A. HEYMAN
BY
ATTORNEYS.

Patented Mar. 29, 1932

1,851,578

UNITED STATES PATENT OFFICE

ALBERT A. HEYMAN, OF BALTIMORE, MARYLAND

METHOD OF BAKING ICE CREAM CONES

Application filed February 7, 1930. Serial No. 426,504.

My invention has for its object to provide a new method of baking pastry having a tendency to adhere, or stick, to its baking container. It is particularly adapted to cup pastry making, such as ice cream cones. It is well known that sugar in pastry causes an increased adherence or sticking to the baking container, and that unsweetened, or slightly sweetened pastry is substantially non-adhering. To avoid this adhering, saccharin is often used instead of sugar as a sweetening agent, also many types of strippers and split molds have been devised, and also methods of removing the cones, but for various reasons, these methods and means have either proved too expensive or ineffective.

By my invention, the container or mold is first charged with a substantially non-adhering pastry batter, which is then distributed over the interior of the mold, and over which the adhering batter is then spread, and the amassed pastry is then baked, the outer layer permitting the easy removal of the baked product. Various methods may be used to keep the non-adhering batter layer spread out while the adhering batter is spread over it. I have found that the most convenient and effective method is to bake or partially bake this first layer of non-adhering batter, and then to add the adhering batter. The non-adhering batter forms a coating around the product and substantially prevents the adhering batter from contacting with the container or mold and this non-adhering batter and the adhering batter are baked together to form one mass. A core may also be coated with a non-adhering layer of batter, which may also be baked or partially baked or dried prior to its insertion into and its spreading of the adhering batter just prior to the final baking. Generally, however, the inside of the cone is so smooth, or due to its shape, or other reason, the cone does not adhere enough to make this initial batter coating necessary.

It will be understood that any suitable mechanism for carrying out the various steps of the present process may be employed, and for the purposes of illustration and description the mechanisms set forth in the drawings accompanying this application and forming a part thereof, constitute forms of mechanisms which may be used, and wherein, Figure 1 is a sectional view of mold and cone, first layer, with the core in place. Fig. 2 is a similar view of the same elements, but with both layers of the cone. Fig. 3 is a sectional view similar to Fig. 2, showing the mold open, and the cone falling from it.

In the drawings similar numerals refer to similar parts throughout the several views.

Figures 1, 2, 3:
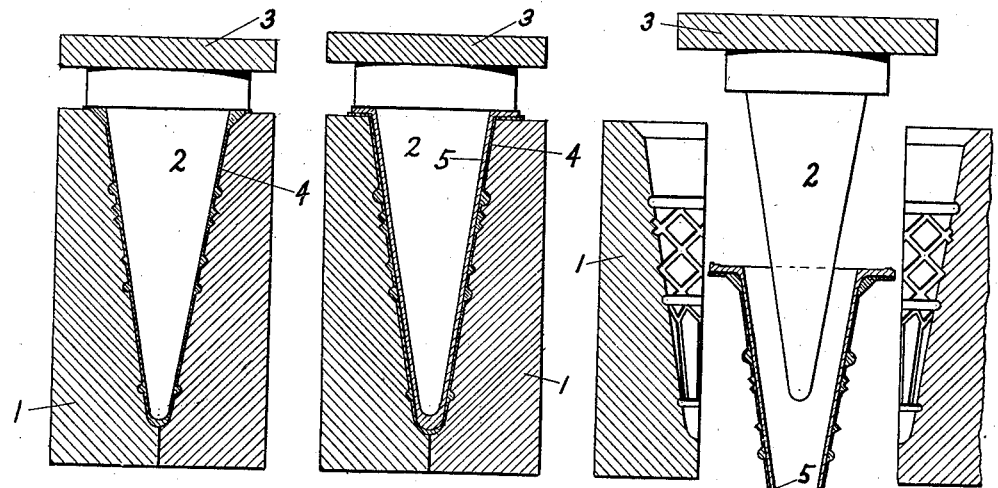

The mold 1 is made in sections that may be spread to release the cone, it may have a design on it as shown, which will make a more rigid cone, but which will also cause more adhering of the cone to the mold. In Fig. 1 the first layer of substantially non-adhering batter 4 has been put in the mold and spread out by the core 2 mounted on core bar 3.

After this batter is set, by baking, drying or otherwise held spread out, the layer of adhering batter 5 is put in and spread out, if desired by the same core 2, Fig. 2. After baking or other desired treatment, the core 2 is removed, the mold spread and the completed cone allowed to fall, Fig. 3.

Figures 5, 7:
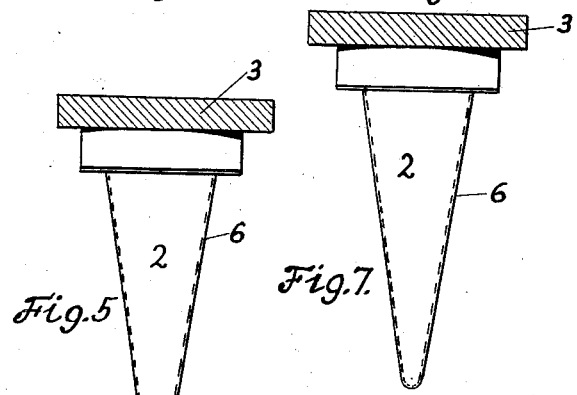
Fig. 5 is a view of the coated core removed from the mold of Fig. 4.
Fig. 7 is a view like Fig. 5, showing the coated core waiting for its next use.
Figures 4, 6:
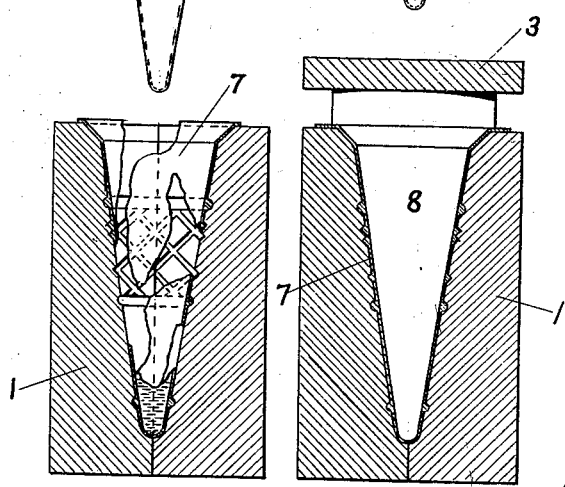
Fig. 4 is a sectional view of a mold with some batter in it.
Fig. 6 is a sectional view of mold and one layer of the cone, and a larger core.
Figure 8:
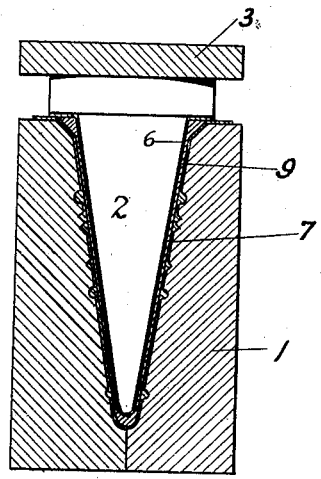
Fig. 8 is a sectional view of the mold and a completed three layer cone, with the core in place.

Should it be desired to also coat the core with some non-adhering batter, this may be done by initially spreading the non-adhering batter by core 2, as was done in the mold as shown in Fig. 4, and withdrawing the core, as in Fig. 5. The batter breaks into splotches 7 in the mold upon withdrawal of the core as shown, but on the core it sets sufficiently rapidly to hold its shape and make a covering 6 for the core. Coated core 2 is then held suspended, as in Fig. 7, while a larger core 8 is used to respread the first layer 7 of the cone and it remains in until the cone is set, Fig. 6. Core 8 is then removed, the adhering batter 9 placed in, and spread by inserting coated core 2, and the completed three layer cone is then baked or otherwise treated, Fig. 8, after which it may be removed by separating the mold and withdrawing the core, as was done with the two layer cone, Fig. 3.

Having thus described my invention, it is obvious that various immaterial modifications may be made within the scope thereof.

I claim:

1. The method of baking ice cream cones, or like confections, which consists of first charging the mold with a substantially non-adhering batter mixture, coating smaller cores by dipping them into this batter, baking this first charge with a larger set of cores, removing this larger set of cores from the baked shell, depositing another charge of sweetened batter into this shell and bringing the batter coated set of cores into baking position and finishing the baking of the cones.

2. The process of baking pastry having a tendency to adhere to its baking mold, comprising covering the interior of the baking mold with a thin layer of substantially non-adhering pastry batter, setting said layer, then covering said layer with the adhering pastry batter, and baking the amassed pastry.

3. The process of baking pastry having a tendency to adhere to its baking mold, comprising covering the interior of the baking mold with a thin layer of substantially non-adhering pastry batter, heating the layer until it sets in the mold, then covering said layer with the adhering pastry batter and baking the amassed pastry.

4. The process of baking pastry having a tendency to adhere to its baking mold, comprising introducing a quantity of substantially non-adhering pastry batter into a mold, distributing said batter in the form of a thin layer over the interior of the mold, and, while said layer remains distributed, covering it with the adhering pastry batter and baking the amassed pastry.

5. The process of baking pastry having a tendency to adhere to its baking mold, comprising introducing a substantially non-adhering pastry batter into a mold, distributing said batter over the interior of the mold by means of a distributing core, setting said non-adhering batter, then covering said non-adhering with the adhering pastry batter and baking the amassed pastry.

6. The process of baking pastry having a tendency to adhere to its baking mold comprising introducing a substantially non-adhering pastry batter into a mold, distributing said batter over the interior of the mold by means of a distributing core, setting said non-adhering batter, then introducing the adhering pastry batter and distributing it over the set batter by means of a distributing core, and then baking the amassed pastry.

7. An edible container comprising an open ended closed bottom compartment, the walls of said container composed of highly sweetened baked batter, and a thin substantially unsweetened coating baked thereon.

In testimony whereof I affix my signature.

ALBERT A. HEYMAN.